(12) United States Patent
Oda et al.

(10) Patent No.: US 9,221,232 B2
(45) Date of Patent: Dec. 29, 2015

(54) CENTRIFUGALLY CAST COMPOSITE ROLL AND ITS PRODUCTION METHOD

(71) Applicant: HITACHI METALS, LTD., Minato-ku, Tokyo (JP)

(72) Inventors: Nozomu Oda, Kitakyusyu (JP); Takayuki Segawa, Kitakyusyu (JP); Yasunori Nozaki, Yasugi (JP)

(73) Assignee: HITACHI METALS, LTD., Tokyo (JP)

( * ) Notice: Subject to any disclaimer, the term of this patent is extended or adjusted under 35 U.S.C. 154(b) by 79 days.

(21) Appl. No.: 14/349,009

(22) PCT Filed: Nov. 21, 2012

(86) PCT No.: PCT/JP2012/080231
§ 371 (c)(1),
(2) Date: Apr. 1, 2014

(87) PCT Pub. No.: WO2013/077377
PCT Pub. Date: May 30, 2013

(65) Prior Publication Data
US 2014/0248511 A1    Sep. 4, 2014

(30) Foreign Application Priority Data
Nov. 21, 2011   (JP) ................................ 2011-253588

(51) Int. Cl.
| | |
|---|---|
| B32B 15/01 | (2006.01) |
| B22D 13/02 | (2006.01) |
| B22D 19/16 | (2006.01) |
| B21B 27/00 | (2006.01) |
| C22C 37/08 | (2006.01) |
| C22C 37/10 | (2006.01) |
| B21B 27/03 | (2006.01) |

(52) U.S. Cl.
CPC .............. *B32B 15/011* (2013.01); *B21B 27/00* (2013.01); *B22D 13/02* (2013.01); *B22D 19/16* (2013.01); *C22C 37/08* (2013.01); *C22C 37/10* (2013.01); *B21B 27/03* (2013.01); *Y10T 29/49563* (2015.01); *Y10T 428/12958* (2015.01)

(58) Field of Classification Search
CPC ........ B21B 27/00; B21B 27/03; B21B 27/02; B21B 27/021; B21B 27/032; B32B 15/011; C22C 37/08; C22C 37/10; B22D 12/02; B22D 19/16; Y10T 428/12958; Y10T 29/4956; Y10T 29/49563; Y10T 29/49565
USPC .......................................... 492/58, 57, 53, 54
See application file for complete search history.

(56) References Cited

U.S. PATENT DOCUMENTS

| | | | |
|---|---|---|---|
| 4,958,422 A * | 9/1990 | Oshima et al. ..................... 492/3 |
| 5,225,007 A * | 7/1993 | Hattori et al. .................. 148/541 |
| 5,514,065 A | 5/1996 | Noda et al. | |
| 5,738,734 A | 4/1998 | Sawa et al. | |
| 6,805,757 B1 | 10/2004 | Windhager et al. | |
| 2004/0214030 A1 | 10/2004 | Windhager et al. | |

FOREIGN PATENT DOCUMENTS

| | | | |
|---|---|---|---|
| EP | 1 190 108 A1 | 3/2002 |
| JP | 06-335712 A | 12/1994 |
| JP | 08-209299 A | 8/1996 |
| JP | 08-302444 A | 11/1996 |
| JP | 2001-321807 A | 11/2001 |
| JP | 2002-543279 A | 12/2002 |
| JP | 2003-073767 A | 3/2003 |
| JP | 2003-342669 A | 12/2003 |
| JP | 2004-068142 A | 3/2004 |
| JP | 2004-082209 A | 3/2004 |
| JP | 2004-162104 A | 6/2004 |
| JP | 2004-323961 A | 11/2004 |
| JP | 2005-105296 A | 4/2005 |
| JP | 2005-169427 A | 6/2005 |
| JP | 2005-177809 A | 7/2005 |
| JP | 2006-281301 A | 10/2006 |

OTHER PUBLICATIONS

International Search Report of PCT/JP2012/080231 dated Feb. 12, 2013.
PCT Third Party Observation for corresponding Application No. PCT/JP2012/080231 dated Feb. 27, 2014.
Written Opinion of the International Searching Authority for corresponding Application No. PCT/JP2012/080231 dated Feb. 12, 2013.

* cited by examiner

*Primary Examiner* — Sarang Afzali
*Assistant Examiner* — Jason L Vaughn
(74) *Attorney, Agent, or Firm* — Sughrue Mion, PLLC (57) ABSTRACT

A centrifugally cast composite roll comprising an outer layer made of cast iron having a chemical composition comprising, by mass, 2.7-3.5% of C, 1.5-2.5% of Si, 0.4-1.0% of Mn, 3.7-5.1% of Ni, 0.8-2.2% of Cr, 1.5-4.5% of Mo, 2.0-4.5% of V, and 0.5-2.0% of Nb, the balance being Fe and inevitable impurities, a mass ratio of Nb/V being 0.18-0.65, and a mass ratio of Mo/V being 0.7-2.5, and a structure comprising, by area, 15-45% of a cementite phase and 1-10% of a graphite phase, and an inner layer made of cast iron having excellent mechanical strength and metallurgically bonded to the outer layer; a usable region of the outer layer as deep as 10 mm or more from the surface containing substantially no speck-like-segregated dendrites of bainite and/or martensite having diameters of 1.5 mm or more.

10 Claims, 3 Drawing Sheets

CENTRIFUGALLY CAST COMPOSITE ROLL AND ITS PRODUCTION METHOD

CROSS REFERENCE TO RELATED APPLICATIONS

This is a National Stage of International Application No. PCT/JP2012/080231 filed Nov. 21, 2012 (claiming priority based on Japanese Patent Application No. 2011-253588 filed Nov. 21, 2011), the contents of which are incorporated herein by reference in their entirety.

FIELD OF THE INVENTION

The present invention relates to a composite roll comprising an outer layer formed by a centrifugal casting method, which is integrally melt-bonded to a tough inner layer, and its production method.

BACKGROUND OF THE INVENTION

Because rolls for hot strip mills are subject to wear and surface roughening on their outer layer surfaces due to a thermal, mechanical load by contact with sheets being rolled, deteriorating the dimensions, shapes and surface qualities of rolled sheets, they should be periodically exchanged. The used rolls are ground to remove wear and surface roughness caused by rolling, and then used for the next rolling. When such roll exchange cycle is short, rolling is frequently interrupted, resulting in low productivity. Accordingly, rolls with good wear resistance and surface roughening resistance are required.

In a hot strip mill, a sheet being rolled may be subject to a so-called folded-rolling trouble, in which the sheet is folded while moving between stands and rolled in a folded state by upper and lower rolls. Particularly in downstream stands, for example, mainly after a fifth stand in a finish-rolling mill having seven stands, such trouble tends to occur because of a high rolling speed.

Because a rolled sheet sticks to an outer layer surface of the roll in such a rolling trouble, an excessive thermal, mechanical load is applied to the roll, so that the outer layer of the roll may be cracked. When the cracked roll continues to be used, cracks are likely to propagate, causing roll breakage, which is called fracture or spalling. Accordingly, once the folded-rolling trouble occurs, a roll surface is cut to remove cracks. Deep cracks need deep cutting, resulting in large roll loss and a high roll cost. Accordingly, rolls having good failure resistance, which suffer little damage by cracking in such a rolling trouble, are desired.

Thus, in downstream stands in a finishing mill, grain rolls containing graphite for excellent failure resistance (seizure resistance) are used. However, because conventional grain rolls have poor wear resistance and thus a short life, the exchange and grinding of rolls should be conducted frequently, resulting in low productivity. On the other hand, high-speed steel rolls comprising outer layers having similar compositions to those of high-speed-tool steels have high wear resistance, but because they do not contain graphite, they suffer seizure and large thermal shock cracking in the folded-rolling trouble. Therefore, the high-speed steel rolls cannot be used in downstream stands in a finishing mill. Thus, improvement in wear resistance is required for grain rolls used in downstream stands in a hot-finish-rolling mill.

Against such demand, JP 2005-105296 A discloses an outer layer for a hot-rolling roll having excellent wear resistance and surface roughening resistance, which has a composition comprising, by mass, 2.5-3.5% of C, 1.0-2.5% of Si, 0.3-1% of Mn, 3-5% of Ni, 1.5-2.5% of Cr, 1.0-4% of Mo, 1.4-3.0% of V, 0.1-0.5% of Nb, and 0.0005-0.2% of B, the balance being Fe and inevitable impurities, and a structure containing 50000-1000000/mm$^2$ of fine carbides having maximum lengths of 0.1-5 μm in at least part of the matrix. This outer layer for the roll is produced by a centrifugal casting method at a casting temperature of 1320° C. and a centrifugal force of 160 G.

It has been found, however, that when an outer layer of grain cast iron containing an increased amount of V, a hard-carbide-forming element, as described in JP 2005-105296 A is centrifugally cast, speck-like-segregated dendrites of bainite and/or martensite grow to as large as 1.5 mm or more in diameter, in a region as deep as about 10 mm or more from the outer layer surface. Speck-like-segregated dendrites with fewer carbides are predominantly worn than an ambient structure, and speck-like worn portions are transferred to a rolled sheet, deteriorating its quality. Such speck-like segregation is caused by solidification segregation in centrifugal casting. Namely, when solidified under a centrifugal force, crystallized low-carbon austenite phases constituting the dendrites have a larger specific gravity than that of a liquid phase, so that they move toward the outer surface side by a centrifugal force. Coarse speck-like-segregated dendrites are formed by the following mechanism: Austenite phases crystallized in a melt having a carbon concentration increased by the migration of austenite phases toward the outer surface side cannot move in a carbon-concentrated melt having increased viscosity due to increase in a solid phase ratio, so that they grow large and are transformed to bainite and/or martensite. Accordingly, the composite roll having an outer layer of grain cast iron, which is described in JP 2005-105296 A, cannot be used in downstream stands in a finishing mill.

JP 6-335712 A discloses a wear-resistant, seizure-resistant hot-rolling roll having a chemical composition comprising, by weight, 2.0-4.0% of C, 0.5-4.0% of Si, 0.1-1.5% of Mn, 2.0-6.0% of Ni, 1.0-7.0% of Cr, and 2.0-8.0% of V, the balance being Fe and impurity elements, and a metal structure comprising a matrix, 0.5-5% by area of graphite, 0.2-10% by area of MC carbide, and 10-40% by area of cementite. JP 6-335712 A further discloses that in addition to the above components, it may further contain, by weight, one or more of 0.3-4.0% of Mo, 1.0-10% of Co, 1.0-10% of Nb, 0.01-2.0% of Ti, 0.002-0.2% of B, and 0.02-1.0% of Cu. However, even this roll contains speck-like-segregated dendrites of bainite and/or martensite. This appears to be due to the fact that as in JP 2005-105296 A, an austenite phase crystallized during centrifugal casting is segregated by a centrifugal force.

JP 2004-323961 A discloses an outer layer for a hot-rolling composite roll, which has a composition comprising 2.6-3.5% by mass of C, 1.5-2.5% by mass of Si, 0.2-1.5% by mass of Mn, 1.0-2.5% by mass of Cr, 1.0-3.0% by mass of Mo, 2.0-7.0% by mass of Ni, 1.3-2.5% by mass of V, 0.1-0.8% by mass of Nb, 0.020-0.2% by mass of B, and one or two of 0.05% or less by mass of Ti and 0.1% or less by mass of Al, the balance being Fe and inevitable impurities, and a structure comprising graphite particles having circle-equivalent diameters of 20 μm or more at 10/mm$^2$ or more, the spheroidization ratio of graphite particles having circle-equivalent diameters of 20 μm or more being 15-75%. Though this reference contemplates the segregation of carbides, it does not specifically disclose the composition conditions of V, Nb and Mo and production conditions for preventing the generation of speck-like-segregated dendrites of bainite and/or martensite inside the outer layer.

JP 2004-162104 A discloses an outer layer for hot-rolling composite roll having a composition comprising, by mass, 2.6-3.5% of C, 1.0-2.5% of Si, 0.2-1.5% of Mn, 0.8-2.7% of Cr, 1.0-3.0% of Mo, 2.0-7.0% of Ni, 1.3-2.5% of V, 0.1-0.8% of Nb, and 0.020-0.2% of B, and the amounts of C, Cr, Nb and V meeting the following formulae (1) to (3):

$$2.0 \leq C-(0.24 \times V+0.13 \times Nb) \leq 3.0 \quad (1),$$

$$Cr/C<1.0 \quad (2), \text{ and}$$

$$3.0 \leq Cr+V \leq 4.5 \quad (3),$$

wherein each of C, V, Nb and Cr represents the amount (% by mass) of each element, and further comprising one or two of less than 0.05% of Ti and 0.1% or less of Al, the balance being Fe and inevitable impurities. Though this reference contemplates the segregation of carbides, it does not specifically disclose the composition conditions of V, Nb and Mo and production conditions for preventing the generation of speck-like-segregated dendrites of bainite and/or martensite in the outer layer.

JP 2003-342669 A discloses an outer layer for a hot-rolling roll having excellent wear resistance, seizure resistance and surface roughening resistance, which has a composition comprising, by mass, 2.4-3.2% of C, 0.9-2.5% of Si, 0.2-1.5% of Mn, 0.8-2.5% of Cr, 1.2-4.0% of Mo, 2.0-7.0% of Ni, 1.5-2.7% of V, 0.1-0.8% of Nb, 0.020-0.2% of B, and 0.0006-0.040% of REM, the amounts of C, Cr, Nb, V meeting the following formulae (1) to (3):

$$1.8 \leq C-(0.236 \times V+0.129 \times Nb) \leq 2.6 \quad (1),$$

$$Cr/C<1.0 \quad (2), \text{ and}$$

$$3.0 \leq Cr+V \leq 4.6 \quad (3),$$

wherein each of C, V, Nb and Cr represents the amount (% by mass) of each element, and further comprising one or two of less than 0.05% of Ti and 0.1% or less of Al, the balance being Fe and inevitable impurities, and a structure comprising graphite. Though this reference contemplates the segregation of carbides, it does not specifically disclose the composition conditions of V, Nb and Mo and production conditions for preventing the generation of speck-like-segregated dendrites of bainite and/or martensite in the outer layer.

JP 2004-68142 A discloses an outer layer for a hot-rolling roll having excellent seizure resistance and wear resistance, which has a composition comprising, by mass, 2.9-3.8% of C, 0.8-2.0% of Si, 0.2-1.5% of Mn, 1.5-3.5% of Cr, 0.8-3.5% of Mo, 3.0-7.0% of Ni, 1.0-3.5% of V, 0.1-0.8% of Nb, 0.020-0.2% of B, and 0.002-0.030% of REM, and the following formulae (1) and (2) being met:

$$2.5 \leq C-(0.236 \times V+0.129 \times Nb) \leq 3.2 \quad (1), \text{ and}$$

$$0.5 \leq Cr/C<1.0 \quad (2),$$

wherein each of C, V, Nb and Cr represents the amount (% by mass) of each element, the balance being Fe and inevitable impurities. Though this reference contemplates the segregation of carbides, it does not specifically disclose the composition conditions of V, Nb and Mo and production conditions for preventing the generation of speck-like-segregated dendrites of bainite and/or martensite in the outer layer.

JP 8-209299 A discloses a hot-rolling roll having high seizure resistance, which comprises, by weight, 2.0-4.0% of C, 1.0-5.0% of Si, 0.1-2.0% of Mn, 0.1-6.0% of Cr, 0.1-6.0% of Mo, 0.1-6.0% of V, and 1.0-8.0% of Ni, the balance being Fe and inevitable impurities. This roll may further contain at least one of 0.1-6.0% of W, 0.1-4.0% of Nb and 0.1-10.0% of Co. However, this reference discloses neither the segregations of carbide, nor the composition conditions of V, Nb and Mo and production conditions for preventing the generation of speck-like-segregated dendrites of bainite and/or martensite in the outer layer.

EP 1190108 B discloses a method for producing a composite roll comprising (1) preparing a melt comprising 2.0-3.5% by weight of C, 1.0-2.0% by weight of Si, 0.5-2.0% by weight of Mn, 1.0-3.0% by weight of Cr, 3.5-4.9% by weight of Ni, and 0.20-2.9% by weight of Mo, the balance being Fe and impurities, (2) dissolving more than 0.5% by weight and 5.9% or less by weight of V, part of which may be substituted by Nb, etc., in the melt, (3) adjusting the composition of the melt, such that its solidification forms a fine structure comprising 1.0-3.0% by volume of graphite, 8-35% by volume of eutectic carbide and at least 1% by volume of V carbide, the balance being substantially martensite, (4) pouring the melt into a centrifugal casting mold, and (5) heat-treating it. However, this reference does not specifically disclose the composition conditions of V, Nb and Mo and production conditions for preventing the generation of speck-like-segregated dendrites of bainite and/or martensite in the outer layer.

JP 2004-82209 A discloses a centrifugally cast, hot-rolling, composite roll comprising an outer shell layer having a composition comprising, by mass, 3.0-4.0% of C, 0.8-2.5% of Si, 0.2-1.2% of Mn, 3.0-5.0% of Ni, 0.5-2.5% of Cr, 0.1-3.0% of Mo, and 1.0-5.0% of V, the balance being Fe and inevitable impurities, and an inner layer made of usual cast iron or spheroidal graphite cast iron containing 2.5-4.0% of C, the thickness T of the outer shell layer and the radius R of the inner layer meeting the relation expressed by the formula of $0.03 \leq T/R \leq 0.5$. However, this reference does not disclose at all the composition conditions of V, Nb and Mo and production conditions for preventing the segregation of carbides and the generation of speck-like-segregated dendrites of bainite and/or martensite in the outer layer.

JP 8-302444 A discloses an outer layer cast at 1400° C. or higher for a centrifugal casting roll, the outer layer comprising 2.5-4.7% of C, 0.8-3.2% of Si, 0.1-2.0% of Mn, 0.4-1.9% of Cr, 0.6-5% of Mo, 3.0-10.0% of V, and 0.6-7.0% of Nb, and meeting the following formulae (1) to (4):

$$2.0+0.15V+0.10Nb \leq C(\%) \quad (1),$$

$$1.1 \leq Mo/Cr \quad (2),$$

$$Nb/V \leq 0.8 \quad (3), \text{ and}$$

$$0.2 \leq Nb/V \quad (4),$$

the balance being Fe and inevitable impurities, and containing granular MC-type carbide and graphite. Though this reference contemplates the segregation of carbides, it does not specifically disclose the composition conditions of V, Nb and Mo and production conditions for preventing the generation of speck-like-segregated dendrites of bainite and/or martensite in the outer layer.

As a centrifugally cast roll comprising an outer layer made of grain cast iron, which does not contain speck-like segregations having diameters of 1.5 mm or more, JP 2001-321807 A discloses a rolling roll comprising an outer layer made of grain cast iron comprising 2.8-3.5% by weight of C, 1.5% or less by weight of Si, 1.5% or less by weight of Mn, 3-5% by weight of Ni, 1-3% by weight of Cr, and less than 1.0% by weight of Mo, the balance being substantially Fe, 90% or more of speck-like segregations having diameters of 1.0 mm or more having diameters of less than 2.0 mm in a rolling region up to the depth of 20-30 mm. The outer layer contains 2.0% or less by weight in total of at least one element selected from the group consisting of 2.0% or less by weight of V, 2.0% or less by weight of Nb, 1.0% or less by weight of Ti, 1.0% or less by weight of Zr, and 1.0% or less by weight of Ta, and having $M_1C_1$-type carbide. However, because the total amount of V and Nb is 2.0% or less by weight, the generation of speck-like-segregated dendrites of bainite and/or martensite in the outer layer cannot be prevented sufficiently.

It is thus difficult to improve the wear resistance of a grain roll to obtain a centrifugally cast composite roll having both good wear resistance and failure resistance with suppressed speck-like-segregated dendrites of bainite and/or martensite.

OBJECT OF THE INVENTION

Accordingly, an object of the present invention is to provide a composite roll comprising a centrifugally cast outer layer having excellent wear resistance and failure resistance (seizure resistance) substantially free from speck-like-segregated dendrites of bainite and/or martensite, and its production method.

SUMMARY OF THE INVENTION

As a result of intensive research in view of the above object, it has been found that (a) because in a centrifugal casting process of grain cast iron containing large amounts of carbide-forming elements, a heavy austenite phase (γ phase) moves toward the outer surface side by a centrifugal force, an austenite phase (γ phase) formed as a primary crystal in a remaining carbon-concentrated melt (low-melting-point eutectic melt) is retained in the melt with increased viscosity by temperature decrease, and grows to large dendrites, and that (b) to suppress the γ phase from moving toward the outer surface side and being concentrated at the initial stage of solidification, it is necessary to regulate not only the amounts of V, Nb and Mo, carbide-forming elements, but also the mass ratios of Nb/V and Mo/V, and to control the casting temperature and centrifugal force during centrifugal casting. The present invention has been completed based on such findings.

The centrifugally cast composite roll of the present invention comprises an outer layer made of cast iron having a chemical composition comprising, by mass, 2.7-3.5% of C, 1.5-2.5% of Si, 0.4-1.0% of Mn, 3.7-5.1% of Ni, 0.8-2.2% of Cr, 1.5-4.5% of Mo, 2.0-4.5% of V, and 0.5-2.0% of Nb, the balance being Fe and inevitable impurities, a mass ratio of Nb/V being 0.18-0.65, and a mass ratio of Mo/V being 0.7-2.5, and a structure comprising, by area, 15-45% of a cementite phase and 1-10% of a graphite phase, and an inner layer made of cast iron having excellent mechanical strength and metallurgically bonded to the outer layer; a usable region of the outer layer as deep as 10 mm or more from the surface containing substantially no speck-like-segregated dendrites of bainite and/or martensite having diameters of 1.5 mm or more. The term "usable region of the outer layer" used herein means a depth-direction region of the outer layer usable for rolling, which is called rolling layer.

The structure of the outer layer preferably comprises, by area, 0.9-9.5% of graphite particles having equivalent-circle diameters of 5 μm or more, 1-20% of V-based carbide particles having equivalent-circle diameters of 1.5-50 μm, and 0.3-15% in total of Nb-based carbide particles having equivalent-circle diameters of 1.5-100 μm and Mo-based carbide particles having equivalent-circle diameters of 1.5-100 μm; the number of the V-based carbide particles being 50-10,000/ $mm^2$, and the total number of the Nb-based carbide particles and the Mo-based carbide particles being 50-10,000/$mm^2$.

The outer layer may further contain, by mass, at least one selected from the group consisting of 0.1-5.0% of W, 0.01-5.0% of Ti, 0.01-2.0% of Al, 0.01-0.5% of Zr, 0.001-0.5% of B, and 0.1-10.0% of Co.

The chemical composition of the outer layer preferably meets, by mass, the conditions of 1.7%≤C−(0.06 Cr+0.063 Mo+0.033 W+0.2 V+0.13 Nb)≤2.7%, 1.8%≤C+Si/3+Ni/18−[(Mo+W+Nb)/15+(Cr+V)/3]≤2.8%, and a mass ratio Mo/Cr of 0.8-5.0.

The outer layer preferably has a chemical composition comprising 2.8-3.5% of C, 1.5-2.3% of Si, 0.5-1.0% of Mn, 3.9-5.0% of Ni, 0.9-1.9% of Cr, 1.7-4.2% of Mo, 2.0-4.0% of V, and 0.5-1.3% of Nb, the balance being Fe and inevitable impurities; a mass ratio of Nb/V being 0.2-0.6, and a mass ratio of Mo/V being 0.7-2.0.

The outer layer preferably meets the requirement that V+1.2 Nb is 2.7-4.5% by mass.

The inner layer is preferably made of ductile cast iron.

The method of the present invention for producing the above centrifugally cast composite roll comprises casting a melt for the outer layer having a chemical composition comprising, by mass, 2.7-3.5% of C, 1.5-2.5% of Si, 0.4-1.0% of Mn, 3.7-5.1% of Ni, 0.8-2.2% of Cr, 1.5-4.5% of Mo, 2.0-4.5% of V, and 0.5-2.0% of Nb, the balance being Fe and inevitable impurities, a mass ratio of Nb/V being 0.18-0.65, and a mass ratio of Mo/V being 0.7-2.5, into a centrifugal casting mold at a temperature in a range from its austenite precipitation start temperature+30° C. to its austenite precipitation start temperature+180° C.; and forming the outer layer under a centrifugal force having a gravity number in a range of 60-150 G.

The centrifugal casting mold is preferably formed by ductile cast iron having a thickness of 120-450 mm.

It is preferable that after an inner surface of the centrifugal casting mold is coated with a facing material as thick as 0.5-5 mm, which mainly comprises silica, alumina, magnesia or zircon, the outer layer is centrifugally cast.

DESCRIPTION OF THE PREFERRED EMBODIMENTS

The embodiments of the present invention will be explained in detail below without intention of restriction, and various modifications may be made within the scope of the present invention.

[1] Centrifugally Cast Composite Roll (A) Composition of Outer Layer

In the centrifugally cast composite roll of the present invention comprising an outer layer formed by a centrifugal casting method and a tough inner layer integrally melt-bonded to the outer layer, the outer layer has the following chemical composition (% by mass).

(1) Indispensable Composition (a) C: 2.7-3.5% by Mass

C is combined with V, Nb, Cr, Mo and W to form hard carbides, contributing to the improvement of the wear resistance of the outer layer, and acts with graphitization-accelerating elements such as Si and Ni to precipitate graphite in the structure, providing the outer layer with seizure resistance. When C is less than 2.7% by mass, the precipitation of graphite is insufficient, the amount of hard carbides precipitated is too small to impart sufficient wear resistance to the outer layer.

Further, when C is less than 2.7% by mass, there is large temperature difference between the crystallization of austenite and the precipitation of eutectic carbide, so that the austenite moves outward by a centrifugal force, resulting in the concentration of carbon in the melt in an inner portion of the outer layer. As a result, large dendrites of austenite are generated and grow in the carbon-concentrated melt. The dendrites of austenite are transformed to bainite and/or martensite, resulting in coarse speck-like segregations. In the present invention, the uniformity of the structure is determined by whether or not there are coarse speck-like segregations having diameters of 1.5 mm or more. On the other hand, when C exceeds 3.5% by mass, strand-shaped graphite is excessively precipitated, resulting in deteriorated mechanical properties such as strength. The excessive precipitation of carbide provides the outer layer with low toughness and crack resistance, resulting in deep cracks by rolling, and increased damage on the roll. The lower limit of the C content is preferably 2.8% by mass, more preferably 2.9% by mass, most preferably 3.0% by mass. Also, the upper limit of the C content is preferably 3.5% by mass, more preferably 3.4% by mass, most preferably 3.35% by mass.

(b) Si: 1.5-2.5% by Mass

Si has a function to deoxidize the melt to reduce oxide defects, and accelerate graphitization, contributing to seizure resistance. Less than 1.5% by mass of Si has an insufficient function of deoxidizing the melt, as well as a poor function of graphitization. On the other hand, more than 2.5% by mass of Si makes the alloy matrix brittle, thereby providing the outer layer with low toughness. The lower limit of the Si content is preferably 1.5% by mass, more preferably 1.6% by mass, most preferably 1.8% by mass. The upper limit of the Si content is preferably 2.3% by mass, more preferably 2.2% by mass, most preferably 2.2% by mass.

(c) Mn: 0.4-1.0% by Mass

Mn has a function to deoxidize the melt, and fix S, an impurity, as MnS. When Mn is less than 0.4% by mass, such effects are insufficient. On the other hand, even though Mn exceeds 1.0% by mass, further increase in the effects cannot be obtained. The lower limit of the Mn content is preferably 0.5% by mass, more preferably 0.6% by mass, most preferably. 0.75% by mass. The upper limit of the Mn content is preferably 1.0% by mass, more preferably 0.9% by mass, most preferably 0.85% by mass.

(d) Ni: 3.7-5.1% by Mass

Ni has a function to precipitate graphite, contributing to seizure resistance. When Ni is less than 3.7% by mass, such effects are insufficient.

On the other hand, more than 5.1% by mass of Ni makes the austenite too stable, making the transformation to bainite or martensite unlikely. The lower limit of the Ni content is preferably 3.9% by mass, more preferably 4.0% by mass, most preferably 4.2% by mass. the upper limit of the Ni content is preferably 5.0% by mass, more preferably 4.8% by mass, most preferably 4.4% by mass.

(e) Cr: 0.8-2.2% by Mass

Cr is an effective element for providing a bainite or martensite matrix to have high hardness, thereby keeping wear resistance. When Cr is less than 0.8% by mass, such effects are insufficient. On the other hand, when Cr exceeds 2.2% by mass, Cr carbides ($M_7C_3$, $M_{23}C_6$) are easily formed, resulting in reduced amounts of V-based carbide and Nb-based carbide contributing to wear resistance. The lower limit of the Cr content is preferably 0.9% by mass, more preferably 1.0% by mass, most preferably 1.1% by mass. The upper limit of the Cr content is preferably 2.0% by mass, more preferably 1.9% by mass, most preferably 1.8% by mass.

(f) Mo: 1.5-4.5% by Mass

Mo is combined with C to form hard Mo carbides ($M_6C$, $M_2C$), increasing the hardness of the outer layer, and improving the hardenability of the alloy matrix. Further, Mo increases the specific gravity of a remaining eutectic melt in the solidification process of the alloy melt, thereby preventing the centrifugal separation of a primary crystal of a γ-phase, and suppressing the segregation of speck-like dendrites of bainite and/or martensite. Mo is dissolved in MC carbides to form tough, hard MC carbides with V and Nb, thereby improving wear resistance. When Mo is less than 1.5% by mass, such effects are insufficient. On the other hand, when Mo is more than 4.5% by mass, the outer layer has poor toughness, and strong white solidification, thereby preventing the precipitation of graphite. The lower limit of the Mo content is preferably 1.7% by mass, more preferably 1.8% by mass, most preferably 2.0% by mass. The upper limit of the Mo content is preferably 4.2% by mass, more preferably 4.1% by mass, most preferably 3.9% by mass.

(g) V: 2.0-4.5% by Mass

V is an element combined with C to form hard V-based carbides (MC carbides). "V-based carbides" are carbides in which the largest amount of an element combined with C is V. The V-based carbides are not restricted to carbides containing only V, but may contain other elements than V. The V-based carbides have Vickers hardness Hv of 2500-3000, the hardest among carbides. When V is less than 2.0% by mass, the amount of MC carbides precipitated is insufficient. On the other hand, when V is more than 4.5% by mass, large MC carbides are formed, resulting in a coarse alloy structure, which is likely to cause surface roughening during rolling. The lower limit of the V content is preferably 2.1% by mass, more preferably 2.2% by mass, most preferably 2.3% by mass. The upper limit of the V content is preferably 4.0% by mass, more preferably 3.5% by mass, most preferably 3.0% by mass.

(h) Nb: 0.5-2.0% by Mass

Nb is combined with C to form Nb-based carbides (MC carbides). "Nb-based carbides" are carbides in which the largest amount of an element combined with C is Nb. The Nb-based carbides are not restricted to carbides containing only Nb, but may contain other elements than Nb. Added together with V and Mo, Nb is dissolved in MC carbides for strengthening, thereby improving the wear resistance of the outer layer. Further, Nb increases the specific gravity of a remaining eutectic melt in the solidification process of the alloy melt, and prevents the centrifugal separation of a primary crystal of a γ-phase, thereby suppressing the segregation of speck-like dendrites of bainite and/or martensite, which are transformed from austenite. Because there is smaller density difference between the Nb-based MC carbides and the melt than between the V-based MC carbides and the melt, Nb reduces the segregation of MC carbides in the centrifugally cast outer layer. When Nb is less than 0.5% by mass, these effects are insufficient. On the other hand, more than 2.0% by mass of Nb provides strong white solidification, preventing the precipitation of graphite, and forming larger MC carbides and accelerating their segregation, thereby providing the outer layer with low surface roughening resistance. The lower limit of the Nb content is preferably 0.55% by mass, more preferably 0.6% by mass, most preferably 0.65% by mass, particularly 0.7% by mass. The upper limit of the Nb content is preferably 1.3% by mass, more preferably 0.9% by mass, most preferably 0.8% by mass.

(i) Nb/V: 0.18-0.65, Mo/V: 0.7-2.5, and V+1.2 Nb: 2.7-4.5

Because any of V, Nb and Mo has a function to increase the amount of hard MC carbides indispensable for wear resistance, the total amount of these elements should be equal to or more than a predetermined level. V is an element decreasing the specific gravity of the melt, while Nb and Mo are elements increasing the specific gravity of the melt. Accordingly, without balance between the amount of V and the amounts of Nb and Mo, there would be large difference in specific gravity between the melt and the austenite, so that the austenite moves toward the outer layer by a centrifugal force, resulting in remarkable concentration of carbon. As a result, dendrites of austenite are likely segregated.

Therefore, it is necessary that a mass ratio of Nb/V is 0.18-0.65, a mass ratio of Mo/V is 0.7-2.5, and V+1.2 Nb is 2.7-4.5% by mass. With Nb/V, Mo/V and V+1.2 Nb within these ranges, proper amounts of Nb and Mo are contained in V-based carbides, so that heavier carbides are uniformly dispersed, thereby preventing the generation of speck-like-segregated dendrites of bainite and/or martensite. The lower limit of the mass ratio of Nb/V is preferably 0.2, more preferably 0.21, most preferably 0.24. The upper limit of the mass ratio of Nb/V is preferably 0.6, more preferably 0.4, most preferably 0.30. The lower limit of the mass ratio of Mo/V is preferably 0.7, more preferably 0.8, most preferably 0.9. The upper limit of the mass ratio of Mo/V is preferably 2.0, more preferably 1.5, most preferably 1.4. The lower limit of V+1.2 Nb is preferably 2.7% by mass, more preferably 2.8% by mass, most preferably 2.9% by mass. The upper limit of V+1.2 Nb is preferably 4.2% by mass, more preferably 4.0% by mass, most preferably 3.9% by mass.

(2) Optional Composition

The outer layer of the centrifugally cast composite roll of the present invention preferably meets, in addition to the above requirements of the indispensable composition, the following composition requirements depending on applications.

(a) W: 0.1-5.0% by Mass

W is combined with C to form hard $M_6C$ and $M_2C$ carbides, contributing to the improvement of the wear resistance of the outer layer. It is also dissolved in MC carbides to increase their specific gravities, resulting in reduced segregation. The preferred amount of W is 0.1-5.0% by mass. When W is less than 0.1% by mass, it provides insufficient effects. On the other hand, when W exceeds 5.0% by mass, the melt is provided with a larger specific gravity, likely resulting in carbide segregation. The upper limit of the W content is more preferably 4.0% by mass, most preferably 2.0% by mass.

(b) Ti: 0.01-5.0% by Mass

Ti is combined with N and O, graphitization-preventing elements, to form oxinitrides. The oxinitrides dispersed in the melt form nuclei, providing finer and more uniform MC carbides. The preferred amount of Ti is 0.01-5.0% by mass. When Ti is less than 0.01% by mass, it provides insufficient effects. On the other hand, when Ti exceeds 5.0% by mass, the melt has increased viscosity, likely generating casting defects. Accordingly, the Ti content is preferably 0.01-5.0% by mass. The upper limit of the Ti content is more preferably 2.0% by mass, most preferably 1.0% by mass.

(c) Al: 0.01-2.0% by Mass

Al is combined with N and O, graphitization-preventing elements, to form oxinitrides. The oxinitrides dispersed in the melt form nuclei, resulting in the uniform precipitation of fine MC carbides. When Al is less than 0.01% by mass, its effects are not expected. On the other hand, when Al exceeds 2.0% by mass, the outer layer becomes brittle. In view of the amounts of N and O contained in the melt, more than 2.0% by mass of Al is unnecessary. Accordingly, the Al content is preferably 0.01-2.0% by mass. The upper limit of the Al content is more preferably 0.5% by mass, most preferably 0.1% by mass.

(d) Zr: 0.01-0.5% by Mass

Zr is combined with C to form MC carbides, improving the wear resistance of the outer layer. Also, a Zr oxide formed in the melt functions as crystal nuclei, making the solidification structure fine, and increasing the specific gravity of the MC carbides, thereby preventing segregation. When Zr is less than 0.01% by mass, this effect is insufficient. On the other hand, when Zr exceeds 0.5% by mass, inclusions are undesirably formed. Accordingly, the Zr content is preferably 0.01-0.5% by mass. The upper limit of the Zr content is more preferably 0.3% by mass, most preferably 0.1% by mass.

(e) B: 0.001-0.5% by Mass

B has a function to make carbides finer, and contributes to the precipitation of graphite when added in a small amount. When B is less than 0.001% by mass, its effects are not sufficient. On the other hand, when B exceeds 0.5% by mass, the carbides become unstable. Accordingly, the B content is preferably 0.001-0.5% by mass. The upper limit of the B content is more preferably 0.1% by mass, most preferably 0.05% by mass.

(f) Co: 0.1-10.0% by Mass

Co is an element effective for strengthening the matrix structure. Also, Co makes it easy to precipitate graphite. When Co is less than 0.1% by mass, its effects are not expected. On the other hand, when Co exceeds 10.0% by mass, the outer layer has decreased toughness. Accordingly, the Co content is preferably 0.1-10.0% by mass. The upper limit of the Co content is more preferably 5.0% by mass, most preferably 2.0% by mass.

(G) Mo/Cr: 0.8-5.0

The mass ratio of Mo/Cr is preferably in a range of 0.8-5.0. When the mass ratio of Mo/Cr is less than 0.8, the Mo content is insufficient relative to the Cr content, resulting in the precipitation of Cr carbide particles such as $M_7C_3$, etc. As a result, the area ratio of Mo-based carbide particles decreases. On the other hand, when the mass ratio of Mo/Cr is 5.0 or more, the Mo-based carbide particles are excessive. Accordingly, the mass ratio of Mo/Cr is preferably 0.8-5.0. The lower limit of the mass ratio of Mo/Cr is more preferably 0.9. The upper limit of the mass ratio of Mo/Cr is more preferably 4.5, most preferably 4.0.

(h) Impurities

The balance in the composition of the outer layer are substantially Fe and inevitable impurities. Among the inevitable impurities, the amounts of P and S deteriorating mechanical properties are preferably as small as possible. Specifically, the P content is preferably 0.1% or less by mass, and the S content is preferably 0.1% or less by mass. As other inevitable impurities, the total amount of elements such as Cu, Sb, Te, Se, etc. may be 0.7% or less by mass.

(B) Structure of Outer Layer

The outer layer of the centrifugally cast composite roll of the present invention has a structure comprising 15-45% by area of a cementite phase and 1-10% by area of a graphite phase. It is preferable that the matrix structure of the outer layer is substantially composed of martensite, bainite or pearlite.

It is preferable that the area ratio of graphite particles having equivalent-circle diameters of 5 μm or more is 0.9-9.5%, that the area ratio of V-based carbide particles having equivalent-circle diameters of 1.5-50 μm is 1-20%, and that the total area ratio of Nb-based carbide particles having equivalent-circle diameters of 1.5-100 μm and Mo-based carbide particles having equivalent-circle diameters of 1.5-100 μm is 0.3-15%. Further, it is preferable that the number of V-based carbide particles having equivalent-circle diameters of 1.5-50 μm per a unit area (1 mm$^2$) of the alloy structure is 50-10,000/mm$^2$, and the total number of Nb-based carbide particles having equivalent-circle diameters of 1.5-100 μm and Mo-based carbide particles having equivalent-circle diameters of 1.5-100 μm is 50-10,000/mm$^2$.

(1) Cementite: 15-45% by Area

Cementite inevitably precipitated when carbides are contained for wear resistance is a relatively soft carbide not only having the effect of improving seizure resistance, but also contributing to the precipitation of graphite necessary for seizure resistance. When the area ratio of cementite is less than 15%, the effect of improving seizure resistance is insufficient. On the other hand, when the area ratio of cementite exceeds 45% by area, the outer layer has decreased toughness. The cementite is preferably 20-40% by area.

To obtain 15-45% by area of cementite, the composition of the outer layer desirably meets the requirement of 1.7% by mass≤C−(0.06 Cr+0.063 Mo+0.033 W+0.2 V+0.13 Nb)≤2.7% by mass. When the value of the above formula is less than 1.7% by mass, carbide-forming elements such as Cr, Mo, etc. are excessive relative to the C content, so that C is consumed by Cr carbide, Mo carbide, etc., resulting in the cementite area ratio of less than 15%. On the other hand, when the value of the above formula is more than 2.7% by mass, the area ratio of cementite exceeds 45%.

(2) Graphite Phase: 1-10% by Area

The area ratio of the graphite phase (graphite particles) precipitated in the outer layer structure is 1-10%. When the graphite phase is less than 1% by area, the effect of improving the seizure resistance of the outer layer is insufficient. On the other hand, when the graphite phase exceeds 10% by area, the outer layer has extremely decreased mechanical properties. The area ratio of the graphite phase is preferably 1-7%, more preferably 1-5%.

To obtain 1-10% by area of the graphite phase, the composition of the outer layer desirably meets the requirement of 1.8% by mass≤C+Si/3+Ni/18−[(Mo+W+Nb)/15+(Cr+V)/3]≤2.8% by mass. When the value of the above formula is less than 1.8% by mass, graphitization-preventing elements such as Mo, W, Nb, Cr and V are excessive relative to C, Si and Ni, so that the area ratio of graphite is less than 1%. On the other hand, when the value of the above formula is more than 2.8% by mass, the amounts of the graphitization-preventing elements are too small, so that the area ratio of graphite is more than 10%.

(3) Graphite Particles Having Equivalent-Circle Diameters of 5 μm or More: 0.9-9.5% by Area Because graphite particles having equivalent-circle diameters of 5 μm or more exhibit large lubricating effects, their area ratio is preferably 0.9-9.5% by area. The term "equivalent-circle diameter" used herein means an outer diameter expressed by a diameter of a circle having the same area as that of each graphite particle. When the graphite particles having equivalent-circle diameters of 5 μm or more are less than 0.9% by area, the outer layer has insufficient seizure resistance. On the other hand, when the graphite particles having equivalent-circle diameters of 5 μm or more are more than 9.5% by area, the outer layer has insufficient wear resistance. The area ratio of the graphite particles having equivalent-circle diameters of 5 μm or more is more preferably 0.9-6.5%, most preferably 0.9-4.5%.

(4) V-Based Carbide Particles Having Equivalent-Circle Diameters of 1.5-50 μm

The V-based carbide particles increase the wear resistance. Among them, V-based carbide particles having equivalent-circle diameters of 1.5 μm or more have the largest contribution to improvement in the wear resistance. Carbide particles having equivalent-circle diameters of less than 1.5 μm are likely detached from the outer layer surface, failing to provide a sufficient effect of improving wear resistance. On the other hand, because the V-based carbide particles are granular, those having equivalent-circle diameters exceeding 50 μm roughen the rolled surface.

The area ratio of V-based carbide particles having equivalent-circle diameters of 1.5-50 μm is 1-20%. When their area ratio is less than 1%, the outer layer does not have sufficient wear resistance. Also, coexistence with graphite makes it difficult to have more than 20% by area of V-based carbide particles having equivalent-circle diameters of 1.5-50 μm. The preferred area ratio of the above carbide particles is 2-15%.

The number of V-based carbide particles having equivalent-circle diameters of 1.5-50 μm per a unit area (1 mm$^2$) of the alloy structure is preferably 50-10,000/mm$^2$. When the above carbide particles are less than 50/mm$^2$, there are too much gaps between adjacent carbides, so that relatively soft matrix portions between carbides are rapidly worn, likely resulting in surface roughening. On the other hand, when the above carbide particles are more than 10,000/mm$^2$, adjacent carbides are likely in contact, so that the outer layer has low toughness. The area ratio of the above carbide particles is preferably 50-5,000/mm$^2$, more preferably 100-5,000/mm$^2$.

(5) Nb-Based Carbide Particles and Mo-Based Carbide Particles Both Having Equivalent-Circle Diameters of 1.5-100 μm The Nb-based carbide particles and the Mo-based carbide particles improve the wear resistance. Among them, Nb-based carbide particles having equivalent-circle diameters of 1.5 μm or more and Mo-based carbide particles having equivalent-circle diameters of 1.5 μm or more have large contribution to improvement in the wear resistance. When their equivalent-circle diameters are less than 1.5 μm, they are likely detached from the outer layer surface, failing to provide a sufficient effect of improving the wear resistance. Because the Nb-based carbide particles and the Mo-based carbide particles likely constitute network structures, their equivalent-circle diameters exceeding 100 μm are likely to roughen the rolled surface. Thus, the area ratio of these carbide particles is preferably 0.3-15%. When the total area ratio of these carbide particles is less than 0.3%, the outer layer does not have sufficient wear resistance. Also, coexistence with graphite makes it difficult to have more than 15% by area of these carbide particles.

The total number of these carbide particles in a unit area (1 mm$^2$) of the alloy structure is preferably 50-10,000/mm$^2$. When the total number of these carbide particles is less than 50/mm$^2$, adjacent carbides are too distant, softer matrix portions between the carbides are likely worn, resulting in surface roughening. On the other hand, when the total number of these carbide particles exceeds 10,000/mm$^2$, adjacent carbides are likely in contact, providing the outer layer with reduced toughness. The total number of these carbide particles is preferably 100-10,000/mm², more preferably 100-5,000/mm².

(6) Other Carbides

The outer layer may contain, in addition to the V-based carbide particles, the Nb-based carbide particles, the Mo-based carbide particles and the cementite, $M_7C_3$ carbide particles at an area ratio of 0.2-10%.

Because the outer layer of the centrifugally cast composite roll of the present invention has the above composition range, and contains V-based carbide particles, Nb-based carbide particles and Mo-based carbide particles in the above ranges, it has excellent wear resistance and failure resistance (seizure resistance), with little speck-like segregation of dendrites of bainite and/or martensite therein.

(C) Inner Layer

The inner layer bonded to the above outer layer is preferably made of tough, ductile cast iron. The ductile cast iron preferably has a composition comprising, by mass, 3.0-4.0% of C, 1.5-3.0% of Si, 0.2-1.0% of Mn, 0.1% or less of P, 0.1% or less of S, 0.7-5.0% of Ni, 0.1-1.0% of Cr, 0.1-1.0% of Mo, and 0.02-0.08% of Mg, the balance being substantially Fe and inevitable impurities. An intermediate layer may exist between the outer layer and the inner layer, for the purposes of suppressing the diffusion of their components, removing tension between them, etc.

(D) Roll Size

The size of the centrifugally cast composite roll of the present invention is not particularly restricted, and its preferred example is that the outer layer has an outer diameter of 200-1300 mm and a roll body length of 500-6000 mm, the usable thickness of the outer layer being 50-200 mm.

[2] Production Method of Centrifugally Cast Composite Roll

The centrifugally cast composite roll of the present invention is produced by (a) casting a melt having the above composition for the outer layer into a rotating cylindrical mold for centrifugal casting, and (b) casting a melt for the inner layer into the resultant hollow outer layer during or after the solidification of the outer layer. In the step (a), the casting temperature of the melt for the outer layer is in a range from an austenite precipitation start temperature+30° C. to the austenite precipitation start temperature+180° C., and the centrifugal force of the rotation of the cylindrical mold for centrifugal casting is in a range of 60-150 G.

(A) Formation of Outer Layer (1) Melt

The melt for the outer layer has a chemical composition comprising, by mass, 2.7-3.5% of C, 1.5-2.5% of Si, 0.4-1.0% of Mn, 3.7-5.1% of Ni, 0.8-2.2% of Cr, 1.5-4.5% of Mo, 2.0-4.5% of V, and 0.5-2.0% of Nb, the balance being Fe and inevitable impurities, a mass ratio of Nb/V being 0.18-0.65, and a mass ratio of Mo/V being 0.7-2.5.

(2) Casting Temperature

The casting temperature of the melt for the outer layer is in a range from the austenite precipitation start temperature+30° C. to the austenite precipitation start temperature+180° C. The casting temperature within this range can shorten a time period in which the liquid phase remains, suppressing the centrifugal separation of a primary crystal of a γ-phase to reduce segregation. When the casting temperature is lower than the austenite precipitation start temperature+30° C., the cast melt has too high a solidification speed, so that foreign matter such as fine inclusions is likely solidified before centrifugal separation, resulting in defects by the foreign matter. On the other hand, when the casting temperature is higher than the austenite precipitation start temperature+180° C., speck-like regions (segregation regions) of aggregated coarse dendrites are formed in the outer layer. The casting temperature is preferably the austenite precipitation start temperature+(30° C. to 100° C.), more preferably the austenite precipitation start temperature+(80° C. to 100° C.). Incidentally, the austenite precipitation start temperature is an exothermal solidification start temperature measured by a differential thermal analyzer.

(3) Centrifugal Force

When the outer layer is cast by a centrifugal casting mold, the centrifugal force is in a range of 60-150 G by a gravity number. When cast at the gravity number in this range, the acceleration can be limited at the time of solidification, resulting in a low moving speed of a primary crystal of a γ-phase, thereby suppressing the centrifugal separation (segregation) of the primary crystal of a γ-phase. At the gravity number of less than 60 G, the outer layer melt is not sufficiently attached to an inner surface of the mold. On the other hand, when the gravity number exceeds 150 G, too much centrifugal separation of the primary crystal of a γ-phase occurs, so that coarse dendrites are formed in a remaining melt with a fewer γ phase. As a result, speck-like-segregated dendrites of bainite and/or martensite are formed in the outer layer. The gravity number (G No.) is expressed by the formula of G No.=N×N×D/1,790,000, wherein N is the number of revolution (rpm) of the mold, and D is the inner diameter (mm) of the mold (corresponding to the outer diameter of the outer layer).

(4) Centrifugal Casting Mold

The centrifugal casting mold is preferably formed by tough ductile cast iron as thick as 120-450 mm. When the mold is as thin as less than 120 mm, the mold has insufficient cooling capability, likely resulting in shrinkage cavities in a surface layer portion of the outer layer. On the other hand, even if the thickness of the mold exceeded 450 mm, its cooling capability would be saturated. The more preferred thickness of the mold is 150-410 mm. The centrifugal casting mold may be horizontal, inclined or vertical.

(5) Facing Material

To prevent the outer layer from sticking to the mold, the inner surface of the mold is preferably coated with a facing material based on silica, alumina, magnesia or zircon at a thickness of 0.5-5 mm. When the facing material is thicker than 5 mm, the melt is cooled slowly, so that the liquid phase remains for a longer period of time, resulting in more centrifugal separation of the primary crystal of a γ-phase, and thus more segregations. On the other hand, the facing material thinner than 0.5 mm provides an insufficient effect of preventing the outer layer from sticking to the mold. The more preferred thickness of the facing material is 0.5-3 mm.

(6) Inoculant

To adjust the amount of graphite precipitated, an inoculant such as Fe—Si, Ca—Si, etc. may be added to the melt. In this case, the melt composition is determined, taking into consideration composition change by the addition of the inoculant.

(7) Formation of Intermediate Layer and Inner Layer

During or after the solidification of the outer layer, a melt for an intermediate layer may be cast into an inner surface of the outer layer. After the intermediate layer is formed, the mold containing the outer layer and the intermediate layer is erected, and provided on its upper and lower ends with an upper mold and a lower mold to constitute a stationary casting mold, into which a melt for the inner layer is cast. Because the inner layer is solidified after the inner surface of the outer layer (or intermediate layer) is remolten, they are metallurgically bonded.

(8) Heat Treatment

Because the outer layer containing 3.7-5.1% by mass of Ni has good hardenability, it need not be hardened after casting. However, to decompose the remaining austenite and remove strain, the resultant composite roll is preferably subject to a heat treatment at 550° C. or lower. After the heat treatment, the composite roll is preferably cooled at a speed of less than 100° C./hour.

The present invention will be explained in further detail by Examples below, without intention of restricting the present invention thereto.

Examples 1-8 and Comparative Examples 1-4

Each melt having the composition (% by mass) shown in Table 1 was cast into a high-speed-rotating cylindrical mold made of ductile cast iron having an inner diameter of 400 mm, a length of 1500 mm and a thickness of 276 mm, which was coated on its inner surface with a 3-mm-thick, zircon-based facing material, to form an outer layer by centrifugal casting. The casting temperature of the melt was between the austenite precipitation start temperature+80° C. and the austenite precipitation start temperature+100° C. The gravity number at an outer surface of the outer layer was 120 G. The resultant outer layer had an average thickness of 96 mm.

After the hollow outer layer was solidified, the rotation of the centrifugal casting mold was stopped, and an upper mold and a lower mold were disposed on both upper and lower ends of the centrifugal casting mold to constitute a stationary casting mold. A ductile cast iron melt for an inner layer was poured into the outer layer, so that the outer layer and the inner layer were metallurgically bonded. After completing the solidification of the inner layer, the mold was disassembled to take out a roll, which was annealed at 500° C. Table 2 shows the amount of remaining carbon $C_{bal}$=C−(0.06 Cr+0.063 Mo+0.033 W+0.2 V+0.13 Nb), the amount of graphitized carbon AA=C+Si/3+Ni/18−[(Mo+W+Nb)/15+(Cr+V)/3], Mo/Cr, Nb/V, and Mo/V in each outer layer.

TABLE 1

| | Composition of Outer Layer (% by mass) | | | | | | | |
|---|---|---|---|---|---|---|---|---|
| No. | C | Si | Mn | Ni | Cr | Mo | V | Nb |
| Example 1 | 2.90 | 1.80 | 0.80 | 4.30 | 1.00 | 3.90 | 3.00 | 0.75 |
| Example 2 | 3.30 | 2.20 | 0.80 | 4.18 | 1.10 | 2.90 | 3.00 | 0.70 |
| Example 3 | 3.30 | 1.88 | 0.80 | 4.25 | 1.75 | 2.80 | 2.50 | 0.50 |
| Example 4 | 3.35 | 1.75 | 0.80 | 4.25 | 1.80 | 1.70 | 2.20 | 0.50 |
| Example 5 | 3.35 | 1.75 | 0.71 | 4.42 | 1.81 | 1.72 | 2.20 | 0.51 |
| Example 6 | 3.30 | 1.85 | 0.79 | 4.25 | 1.75 | 2.80 | 2.52 | 0.52 |
| Example 7 | 3.21 | 2.05 | 0.59 | 4.17 | 2.17 | 3.61 | 2.11 | 1.20 |
| Example 8 | 3.30 | 2.21 | 0.48 | 4.25 | 1.15 | 2.90 | 3.00 | 0.80 |
| Com. Ex. 1 | 2.20 | 2.10 | 0.68 | 4.11 | 2.32 | 3.35 | 2.81 | 1.40 |
| Com. Ex. 2 | 3.24 | 1.30 | 0.80 | 4.30 | 1.52 | 0.41 | 0.50 | — |
| Com. Ex. 3 | 1.92 | 0.58 | 0.58 | 3.66 | 2.44 | 5.21 | 3.47 | 0.35 |
| Com. Ex. 4 | 2.50 | 1.61 | 0.58 | 3.76 | 1.52 | 3.51 | 9.18 | 0.34 |

| | Composition of Outer Layer (% by mass) | | | | | |
|---|---|---|---|---|---|---|
| No. | W | Ti | Al | Zr | B | Co |
| Example 1 | 1.00 | — | — | — | — | — |
| Example 2 | 1.00 | — | — | — | — | — |
| Example 3 | — | — | — | — | — | — |
| Example 4 | — | — | — | — | — | — |
| Example 5 | — | 0.01 | 0.01 | — | — | — |
| Example 6 | — | 0.02 | — | — | — | — |
| Example 7 | — | — | — | — | — | — |
| Example 8 | — | — | — | — | — | — |
| Com. Ex. 1 | 1.12 | 0.01 | 0.01 | — | — | — |
| Com. Ex. 2 | — | — | — | — | — | — |
| Com. Ex. 3 | 0.50 | 0.01 | — | — | — | — |
| Com. Ex. 4 | 1.82 | 0.01 | — | — | — | — |

TABLE 2

| | Composition of Outer Layer (% by mass) | | | | | |
|---|---|---|---|---|---|---|
| No. | Nb/V | Mo/V | Mo/Cr | V + 1.2 Nb | $C_{bal}$[1] | AA[2] |
| Example 1 | 0.25 | 1.30 | 3.90 | 3.90 | 1.86 | 2.03 |
| Example 2 | 0.23 | 0.97 | 2.64 | 3.84 | 2.33 | 2.59 |
| Example 3 | 0.20 | 1.12 | 1.60 | 3.10 | 2.45 | 2.53 |
| Example 4 | 0.23 | 0.77 | 0.94 | 2.80 | 2.63 | 2.69 |
| Example 5 | 0.23 | 0.78 | 0.95 | 2.81 | 2.63 | 2.69 |
| Example 6 | 0.21 | 1.11 | 1.60 | 3.14 | 2.45 | 2.51 |
| Example 7 | 0.57 | 1.71 | 1.66 | 3.55 | 2.27 | 2.38 |
| Example 8 | 0.27 | 0.97 | 2.52 | 3.96 | 2.34 | 2.64 |
| Com. Ex. 1 | 0.50 | 1.19 | 1.44 | 4.49 | 1.07 | 1.03 |
| Com. Ex. 2 | 0.00 | 0.82 | 0.27 | 0.5 | 3.02 | 3.21 |
| Com. Ex. 3 | 0.10 | 1.50 | 2.14 | 3.89 | 0.69 | −0.06 |
| Com. Ex. 4 | 0.04 | 0.38 | 2.31 | 9.58 | 0.25 | −0.70 |

Note:
[1] $C_{bal}$ = C − (0.06 Cr + 0.063 Mo + 0.033 W + 0.2 V + 0.13 Nb).
[2] AA = C + Si/3 + Ni/18 − [(Mo + W + Nb)/15 + (Cr + V)/3].

With respect to a test piece cut out of each outer layer of Examples and Comparative Examples, an optical photomicrograph and a BSE photograph were taken by the following procedure.

Step 1: Each test piece was mirror-polished such that carbides did not project from the surface.

Step 2: An optical photomicrograph A of each test piece structure was taken.

Step 3: A photograph B of a BSE image (backscattered electron image of a scanning electron photomicrograph) of each test piece was taken in the same field as in the photograph of the step 2.

Step 4: Each test piece was electrolytically etched by an aqueous chromic acid solution for about 1 minute, and then buffed using a 3-μm-diamond paste for 30-60 seconds.

Step 5: An optical photomicrograph C of each test piece structure was taken in the same field as in the photograph of the step 2.

Step 6: Each test piece was etched by an aqueous ammonium persulfate solution for about 1 minute.

Step 7: An optical photomicrograph D of each test piece structure was taken in the same field as in the photograph of the step 2.

Step 8: Each test piece was heated to 50-70° C., and then etched by a Murakami's reagent for about 1 minute.

Step 9: An optical photomicrograph E of each test piece structure was taken in the same field as in the photograph of the step 2.

Figure 3:
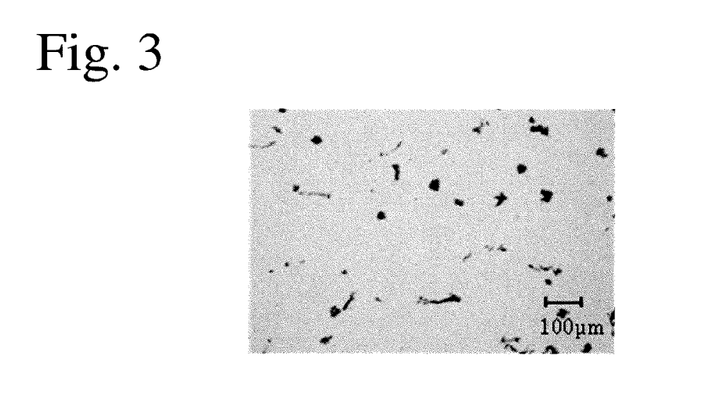
FIG. 3 is an optical photomicrograph A showing the structure of the test piece of Example 1 taken in the step 2.
Figure 4:
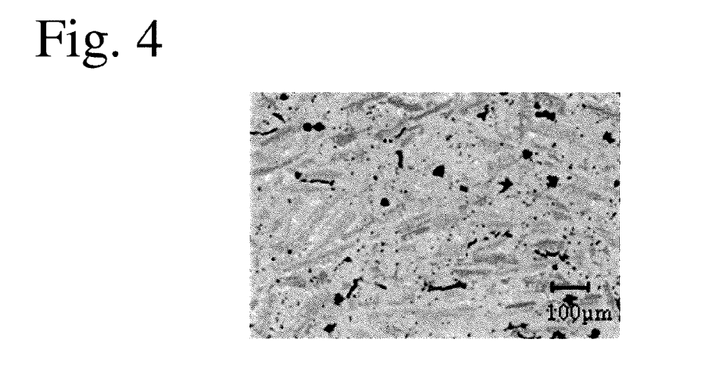
FIG. 4 is a photograph B of a BSE image showing the structure of the test piece of Example 1 taken in the step 3.
Figure 5:
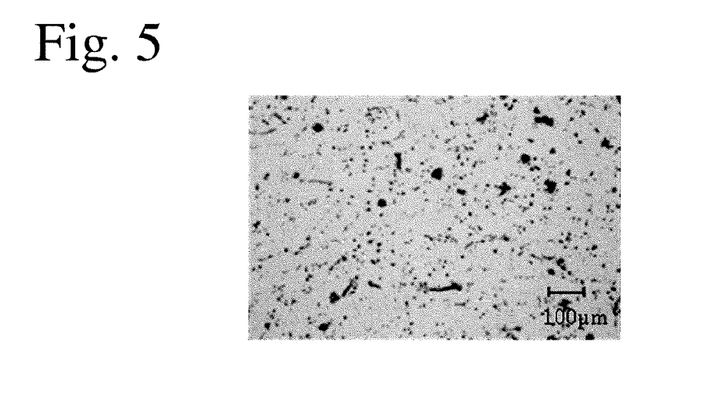
FIG. 5 is an optical photomicrograph C showing the structure of the test piece of Example 1 taken in the step 5.
Figure 6:
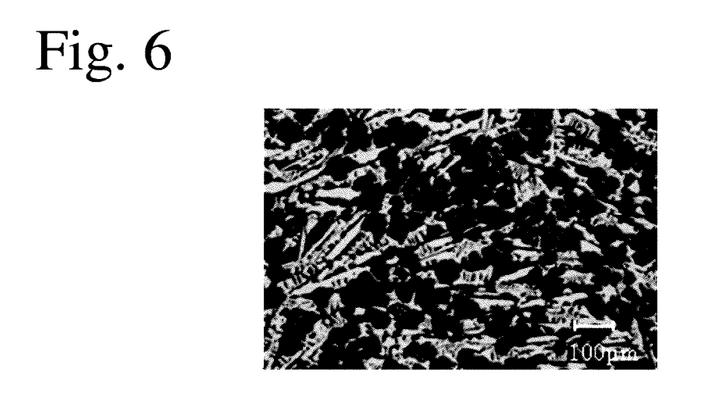
FIG. 6 is an optical photomicrograph D showing the structure of the test piece of Example 1 taken in the step 7.
Figure 7:
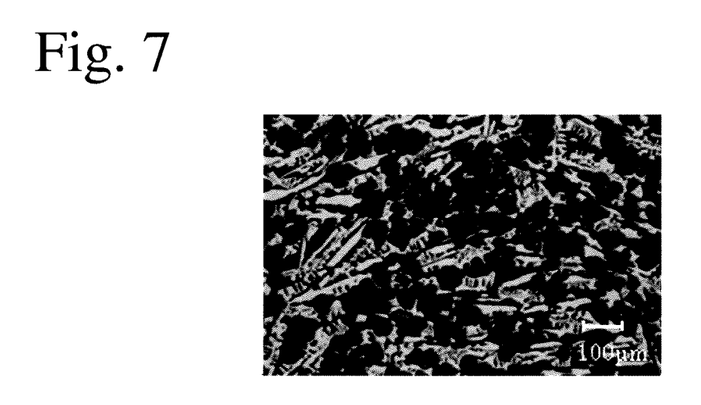
FIG. 7 is an optical photomicrograph E showing the structure of the test piece of Example 1 taken in the step 9.

With respect to the test piece of Example 1, its optical photomicrograph A is shown in FIG. 3, its optical photomicrograph B is shown in FIG. 4, its optical photomicrograph C is shown in FIG. 5, its optical photomicrograph D is shown in FIG. 6, and its optical photomicrograph E is shown in FIG. 7. Structural elements measurable from the photographs A-E are shown by "Yes" in Table 3.

TABLE 3

| Photograph | Graphite Particles | V-Based Carbide Particles | Nb-Based Carbide Particles | Mo-Based Carbide Particles | Cementite |
|---|---|---|---|---|---|
| A | Yes | — | — | — | — |
| B | — | — | Yes | Yes | — |
| C | Yes | Yes | Yes | — | — |
| D | — | — | — | Yes | Yes |
| E | — | — | — | — | Yes |

Using image analysis software, the area ratios and numbers of cementite, graphite particles and carbide particles were determined from these photographs by the following methods. The results are shown in Table 4.

(1) Because black portions represent graphite particles in the optical photomicrograph A, the area ratio of graphite particles (the area ratio of all graphite particles and the area ratio of graphite particles having equivalent-circle diameters of 5 μm or more) was determined from the photograph A.

(2) Because white portions represent cementite in the optical photomicrograph E, the area ratio of cementite was determined from the photograph E.

(3) Because white portions represent Mo-based carbide particles and cementite in the optical photomicrograph D, the area ratio of Mo-based carbide particles equivalent-circle diameters of 1.5-100 μm and their numbers per a unit area were determined from the photographs D and E.

(4) Because white portions represent Nb-based carbide particles and Mo-based carbide particles in the photograph B, the area ratio of Nb-based carbide particles having equivalent-circle diameters of 1.5-100 μm and their numbers per a unit area were determined by subtracting the area ratio of Mo-based carbide particles having equivalent-circle diameters of 1.5-100 μm and their numbers per a unit area determined in the step (3) from the area ratio of carbide particles (Nb-based carbide particles+Mo-based carbide particles) having equivalent-circle diameters of 1.5-100 μm and their numbers per a unit area determined from the photograph B.

(5) Because black portions represent graphite particles, V-based carbide particles and Nb-based carbide particles in the optical photomicrograph D, the area ratio of V-based carbide particles having equivalent-circle diameters of 1.5-50 μm and their numbers per a unit area were determined by subtracting the area ratio of graphite particles determined in the step (1) and the area ratio of Nb-based carbide particles having equivalent-circle diameters of 1.5-100 μm and their numbers per a unit area determined in the step (4) from the area ratio of graphite particles+V-based carbide particles having equivalent-circle diameters of 1.5-50 μm+Nb-based carbide particles having equivalent-circle diameters of 1.5-100 μm and their numbers per a unit area determined from the photograph D.

Figure 1:
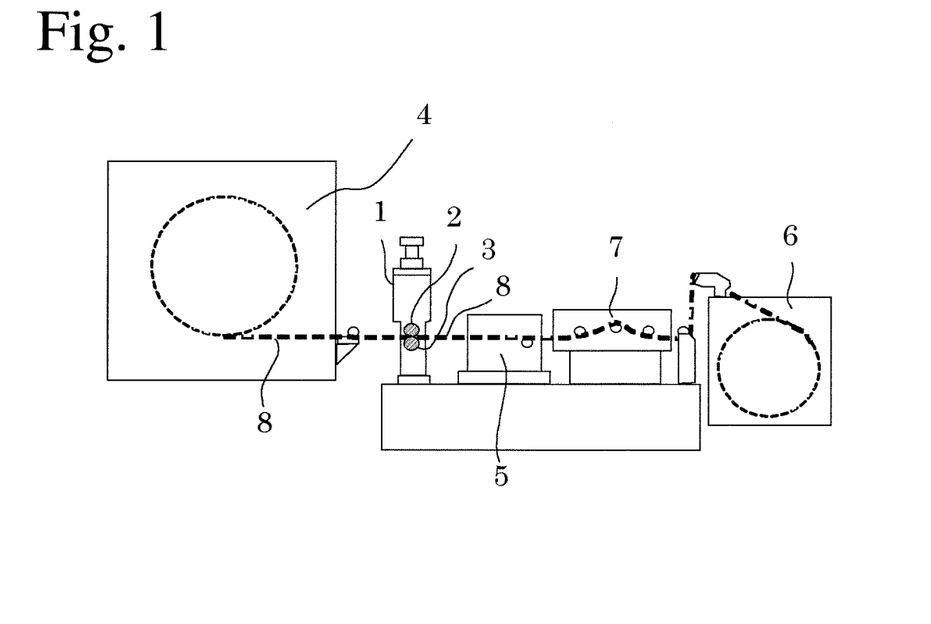
FIG. 1 is a schematic view showing a rolling wear test machine.

Using each melt for an outer layer in Examples and Comparative Examples, a test roll having a sleeve structure of 60 mm in outer diameter, 40 mm in inner diameter and 40 mm in width was produced. To evaluate the wear resistance, a wear test was conducted on each test roll by a rolling wear test machine shown in FIG. 1. The rolling wear test machine comprises a rolling machine 1, test rolls 2, 3 assembled in the rolling machine 1, a furnace 4 for preheating a sheet 8 to be rolled, a cooling water bath 5 for cooling the rolled sheet 8, a winding reel 6 for providing a tension during rolling, and a controller 7 for adjusting the tension. The rolling wear conditions are shown below. After rolling, the depth of wear generated on test roll surfaces was measured by a stylus-type surface roughness meter. The results are shown in Table 4.

Sheet to be rolled: SUS304,

Rolling reduction: 25%,

Rolling speed: 150 m/minute,

Temperature of sheet to be rolled: 900° C.,

Rolling distance: 300 m/cycle,

Cooling of roll: Water-cooling, and

The number of rolls: 4.

Figure 2:
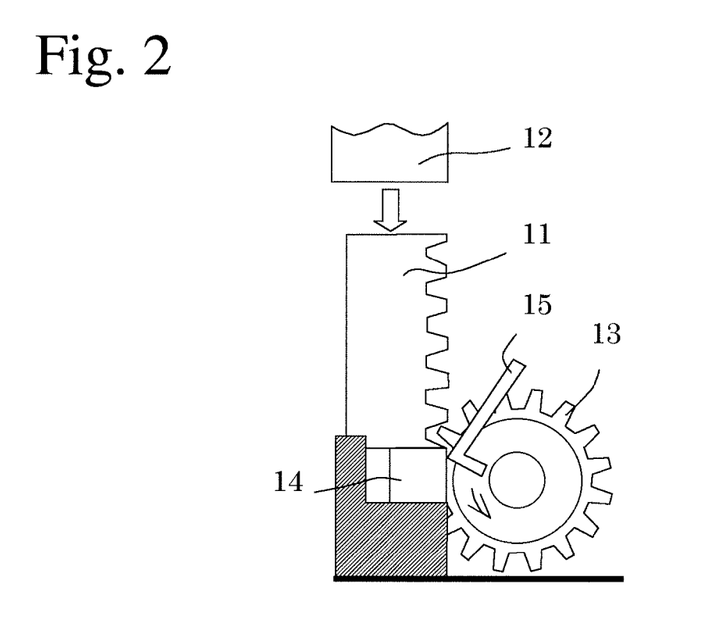
FIG. 2 is a schematic view showing a friction thermal shock test machine.

To evaluate failure resistance, a seizure test was conducted on each test roll by a test machine of thermal shock by friction shown in FIG. 2. The test machine of thermal shock by friction comprises a rack 11 onto which a weight 12 is dropped to rotate a pinion 13, so that a biting member 15 is brought into strong contact with a test piece 14. The seizure was evaluated by the following standard. The results are shown in Table 4. The smaller the seizure, the better the failure resistance.

Good: No seizure,

Fair: Slight seizure, and

Poor: Extreme seizure.

Planes of 10 mm, 30 mm and 50 mm, respectively, in depth from an outer surface of each outer layer of Examples and Comparative Examples were mirror-polished, and etched with an aqueous ammonium persulfate solution for about 1 minute, and their structures were photographed at a magnification of 5-10 times. In each photographed structure, speck-like-segregated dendrites of bainite and/or martensite having diameters of 1.5 mm or more inside the outer layer (in a rolling-usable layer) were observed to evaluate the homogeneity of the structure by the following standard. The results are shown in Table 4.

Good: No speck-like segregations having diameters of 1.5 mm or more, and

Poor: There were speck-like segregations having diameters of 1.5 mm or more.

TABLE 4

| | Structure of Outer Layer | | | | | | |
|---|---|---|---|---|---|---|---|
| | Area Ratio of Cementite | Area Ratio of Graphite (%) | | V-Based Carbide[1] | | Nb-Based Carbide[2] + Mo-Based Carbide[3] | |
| No. | (%) | Total | ≥5 μm[4] | Area Ratio (%) | Number (/mm$^2$) | Area Ratio (%) | Number (/mm$^2$) |
| Example 1 | 25.2 | 1.73 | 1.54 | 2.63 | 1771 | 3.41 | 983 |
| Example 2 | 28.3 | 4.41 | 4.28 | 2.38 | 1964 | 3.24 | 894 |

TABLE 4-continued

| | | | | | | | |
|---|---|---|---|---|---|---|---|
| Example 3 | 30.1 | 4.78 | 4.67 | 2.78 | 1872 | 1.32 | 634 |
| Example 4 | 32.4 | 5.42 | 5.36 | 1.57 | 1203 | 0.82 | 548 |
| Example 5 | 32.1 | 5.66 | 5.56 | 1.65 | 1119 | 0.75 | 725 |
| Example 6 | 30.5 | 4.72 | 4.61 | 2.87 | 1727 | 1.27 | 707 |
| Example 7 | 27.3 | 4.43 | 4.32 | 1.52 | 627 | 6.38 | 668 |
| Example 8 | 25.3 | 4.82 | 4.71 | 3.02 | 1602 | 3.56 | 755 |
| Com. Ex. 1 | 18.6 | <0.05 | <0.05 | 2.27 | 1721 | 6.10 | 821 |
| Com. Ex. 2 | 36.2 | 4.52 | 4.42 | 0.32 | 107 | 0.12 | 0 |
| Com. Ex. 3 | 0 | <0.05 | <0.05 | 4.21 | 2248 | 3.20 | 259 |
| Com. Ex. 4 | 0 | <0.05 | <0.05 | 21.20 | 1974 | 4.27 | 427 |

| | Structure of Outer Layer | | |
|---|---|---|---|
| No. | Wear ($\mu$m) | Seizure | Homogeneity of Structure[5] |
| Example 1 | 15 | Good | Good |
| Example 2 | 19 | Good | Good |
| Example 3 | 20 | Good | Good |
| Example 4 | 23 | Good | Good |
| Example 5 | 24 | Good | Good |
| Example 6 | 21 | Good | Good |
| Example 7 | 23 | Good | Good |
| Example 8 | 15 | Good | Good |
| Com. Ex. 1 | 17 | Fair | Poor |
| Com. Ex. 2 | 38 | Good | Poor |
| Com. Ex. 3 | 17 | Poor | Poor |
| Com. Ex. 4 | 11 | Poor | Poor |

Note:
[1] V-based carbide particles having equivalent-circle diameters of 1.5-50 $\mu$m.
[2] Nb-based carbide particles having equivalent-circle diameters of 1.5-100 $\mu$m.
[3] Mo-based carbide particles having equivalent-circle diameters of 1.5-100 $\mu$m.
[4] Graphite particles having equivalent-circle diameters of 5 $\mu$m or more.
[5] Determined by the presence of speck-like-segregated dendrites having diameters of 1.5 mm or more at depth of 10 mm, 30 mm and 50 mm, respectively.

In any Examples, the outer layer did not contain speck-like-segregated dendrites of bainite and/or martensite, having excellent homogeneity in the structure as well as excellent wear resistance and seizure resistance (failure resistance). On the other hand, the outer layers of Comparative Examples contained speck-like-segregated dendrites of bainite and/or martensite, and were poor in either one of wear resistance and seizure resistance.

Example 9, and Comparative Example 5

A melt having the composition (% by mass) shown in Table 5 was cast into a high-speed-rotating cylindrical mold made of ductile cast iron having an inner diameter of 400 mm, a length of 1500 mm and a thickness of 276 mm, which was coated on its inner surface with a 2.5-mm-thick, zircon-based facing material, to form an outer layer by centrifugal casting under the conditions shown in Table 6. The austenite precipitation start temperature of the outer layer was 1216° C. The gravity number at an outer surface of the outer layer was 120 G. The resultant outer layer had an average thickness of 96 mm.

TABLE 5

| Composition of Melt for Outer Layer (% by mass) | | | | | | | | |
|---|---|---|---|---|---|---|---|---|
| C | Si | Mn | Ni | Cr | Mo | V | Nb | Al |
| 3.15 | 1.76 | 0.59 | 3.80 | 1.25 | 2.35 | 2.80 | 0.53 | 0.03 |

TABLE 6

| No. | Pouring Temperature from Furnace (° C.) | Casting Temperature (° C.) | Gravity Number (G) |
|---|---|---|---|
| Example 9 | 1440 | 1276 | 120 |
| Com. Ex. 5 | 1460 | 1242 | 120 |

After the hollow outer layer was solidified, the rotation of the centrifugal casting mold was stopped, and a ductile cast iron melt for an inner layer was poured into the outer layer in the same manner as in Example 1 to metallurgically bond the inner layer to the outer layer. After completing the solidification of the inner layer, the mold was disassembled to take out a roll, which was annealed at 500° C.

The data of the outer layer structure (the area ratios of cementite, all graphite particles and graphite particles having equivalent-circle diameters of 5 $\mu$m or more, the area ratio and number of V-based carbide particles having equivalent-circle diameters of 1.5-50 $\mu$m, and the total area ratio and number of Nb-based carbide particles having equivalent-circle diameters of 1.5-100 $\mu$m and Mo-based carbide particles having equivalent-circle diameters of 1.5-100 $\mu$m) measured in the same manner as in Example 1 are shown in Table 7. Also, the homogeneity of the structure (presence or absence of speck-like-segregated dendrites of bainite and/or martensite) measured and evaluated at depth of 50 mm from the outer layer surface in the same manner as in Example 1 is shown in Table 7.

TABLE 7

| No. | Area Ratio of Cementite (%) | Area Ratio of Graphite (%) Total | Area Ratio of Graphite (%) ≥5 μm[4] | V-Based Carbide[1] Area Ratio (%) | V-Based Carbide[1] Number (/mm$^2$) | Nb-Based Carbide[2] + Mo-Based Carbide[3] Area Ratio (%) | Nb-Based Carbide[2] + Mo-Based Carbide[3] Number (/mm$^2$) | Homogeneity of Structure |
|---|---|---|---|---|---|---|---|---|
| Example 9 | 28 | 3.8 | 3.7 | 3.2 | 1827 | 1.38 | 698 | Good |
| Com. Ex. 5 | 39 | 3.2 | 3.1 | 3.4 | 1216 | 1.41 | 631 | Poor |

Note:
[1]V-based carbide particles having equivalent-circle diameters of 1.5-50 μm.
[2]Nb-based carbide particles having equivalent-circle diameters of 1.5-100 μm.
[3]Mo-based carbide particles having equivalent-circle diameters of 1.5-100 μm.
[4]Graphite particles having equivalent-circle diameters of 5 μm or more.

EFFECT OF THE INVENTION

Because the centrifugally cast composite roll of the present invention comprises an outer layer having excellent wear resistance and failure resistance (resistance to deep cracking in rolling troubles such as rolling of folded tail ends, etc.), with few speck-like-segregated dendrites of bainite and/or martensite (having a homogeneous structure), it has excellent durability with little surface roughening. Accordingly, it is suitable as a work roll used in downstream stands in finish-rolling lines for hot strip mills, which require particularly smooth rolling surfaces.

What is claimed is:

1. A centrifugally cast composite roll comprising an outer layer made of cast iron having a chemical composition comprising, by mass, 2.7-3.5% of C, 1.5-2.5% of Si, 0.4-1.0% of Mn, 3.7-5.1% of Ni, 0.8-2.2% of Cr, 1.5-4.5% of Mo, 2.0-4.5% of V, and 0.5-2.0% of Nb, the balance being Fe and inevitable impurities, a mass ratio of Nb/V being 0.18-0.65, and a mass ratio of Mo/V being 0.7-2.5, and a structure comprising, by area, 15-45% of a cementite phase and 1-10% of a graphite phase, and an inner layer made of cast iron having excellent mechanical strength and metallurgically bonded to said outer layer; a usable region of said outer layer as deep as 10 mm or more from the surface containing substantially no speck-like-segregated dendrites of bainite or martensite having diameters of 1.5 mm or more.

2. The centrifugally cast composite roll according to claim 1, wherein the structure of said outer layer comprises 0.9-9.5% by area of graphite particles having equivalent-circle diameters of 5 μm or more, 1-20% by area of V-based carbide particles having equivalent-circle diameters of 1.5-50 μm, and 0.3-15% by area in total of Nb-based carbide particles having equivalent-circle diameters of 1.5-100 μm and Mo-based carbide particles having equivalent-circle diameters of 1.5-100 μm; the number of said V-based carbide particles being 50-10,000/mm$^2$, and the total number of said Nb-based carbide particles and said Mo-based carbide particles being 50-10,000/mm$^2$.

3. The centrifugally cast composite roll according to claim 1, wherein said outer layer further comprises, by mass, at least one selected from the group consisting of 0.1-5.0% of W, 0.01-5.0% of Ti, 0.01-2.0% of Al, 0.01-0.5% of Zr, 0.001-0.5% of B, and 0.1-10.0% of Co.

4. The centrifugally cast composite roll according to claim 1, wherein the chemical composition of said outer layer meets the conditions of 1.7%≤C−(0.06 Cr+0.063 Mo+0.033 W+0.2 V+0.13 Nb)≤2.7%, and 1.8%≤C+Si/3+Ni/18−[(Mo+W+Nb)/15+(Cr+V)/3]≤2.8% by mass, a mass ratio of Mo/Cr being 0.8-5.0.

5. The centrifugally cast composite roll according to claim 1, wherein said outer layer has a chemical composition comprising 2.8-3.5% of C, 1.5-2.3% of Si, 0.5-1.0% of Mn, 3.9-5.0% of Ni, 0.9-1.9% of Cr, 1.7-4.2% of Mo, 2.0-4.0% of V, and 0.5-1.3% of Nb, the balance being Fe and inevitable impurities, a mass ratio of Nb/V being 0.2-0.6, and a mass ratio of Mo/V being 0.7-2.0.

6. The centrifugally cast composite roll according to claim 1, wherein V+1.2 Nb is 2.7-4.5% by mass.

7. The centrifugally cast composite roll according to claim 1, wherein said inner layer is made of ductile cast iron.

8. A method for producing a centrifugally cast composite roll comprising an outer layer made of cast iron having a structure comprising, by area, 15-45% of a cementite phase and 1-10% of a graphite phase, and an inner layer made of cast iron having excellent mechanical strength and metallurgically bonded to said outer layer; a usable region of said outer layer as deep as 10 mm or more from the surface containing substantially no speck-like-segregated dendrites of bainite or martensite having diameters of 1.5 mm or more, the method comprising casting a melt for said outer layer having a chemical composition comprising, by mass, 2.7-3.5% of C, 1.5-2.5% of Si, 0.4-1.0% of Mn, 3.7-5.1% of Ni, 0.8-2.2% of Cr, 1.5-4.5% of Mo, 2.0-4.5% of V, and 0.5-2.0% of Nb, the balance being Fe and inevitable impurities, a mass ratio of Nb/V being 0.18-0.65, and a mass ratio of Mo/V being 0.7-2.5, into a centrifugal casting mold at a temperature in a range from its austenite precipitation start temperature+30° C. to its austenite precipitation start temperature+180° C., and forming said outer layer under a centrifugal force having a gravity number in a range of 60-150 G.

9. The method for producing a centrifugally cast composite roll according to claim 8, wherein said centrifugal casting mold is formed by ductile cast iron having a thickness of 120-450 mm.

10. The method for producing a centrifugally cast composite roll according to claim 8, wherein said centrifugal casting mold is coated on its inner surface with a facing material mainly comprising silica, alumina, magnesia or zircon at a thickness of 0.5-5 mm, to centrifugally cast said outer layer.

* * * * *